(12) United States Patent
Jendrichowski et al.

(10) Patent No.: US 8,978,230 B2
(45) Date of Patent: Mar. 17, 2015

(54) BEVERAGE BOTTLE HANDLING MACHINE CONSTRUCTION METHOD

(75) Inventors: Klaus Jendrichowski, Holzwickede (DE); Ulrich Wiedemann, Dortmund (DE)

(73) Assignee: KHS GmbH, Dortmund (DE)

( * ) Notice: Subject to any disclaimer, the term of this patent is extended or adjusted under 35 U.S.C. 154(b) by 1346 days.

(21) Appl. No.: 12/715,096

(22) Filed: Mar. 1, 2010

(65) Prior Publication Data

US 2010/0212140 A1    Aug. 26, 2010

Related U.S. Application Data (63) Continuation-in-part of application No. PCT/EP2008/005886, filed on Jul. 18, 2008.

(30) Foreign Application Priority Data

Aug. 30, 2007  (DE) .......................... 10 2007 041 251

(51) Int. Cl.
*B21J 15/02* (2006.01)
*B23Q 3/18* (2006.01)
(Continued)

(52) U.S. Cl.
CPC .................. *B23K 37/04* (2013.01); *B23P 19/10* (2013.01); *F16M 5/00* (2013.01)
USPC .................... 29/464; 29/466; 29/467; 29/468; 29/469; 29/524.1; 29/525.06; 29/525.13; 29/525.14; 228/4.1; 228/6.1

(58) Field of Classification Search
CPC ........... F16M 5/00; B23P 19/10; B23K 37/04
USPC .............. 29/464, 466, 467, 468, 469, 897.31, 29/897.312, 525.13, 525.14, 524.1, 29/525.06; 219/121.64, 121.69, 121.14; 228/4.1, 6.1, 101, 175, 176, 177, 227, 228/228, 229, 230

See application file for complete search history.

(56) References Cited

U.S. PATENT DOCUMENTS

| | | | |
|---|---|---|---|
| 2,738,866 | A | 3/1956 | Vamvakas et al. |
| 3,307,894 | A | 3/1967 | Collier |

(Continued)

FOREIGN PATENT DOCUMENTS

| | | |
|---|---|---|
| DE | 3433445 A1 | 3/1986 |
| DE | 101 58 264 | 10/2002 |

(Continued)

OTHER PUBLICATIONS

International Search Report PCT/EP2008/005886 and English translation thereof.

*Primary Examiner* — Jermie Cozart
(74) *Attorney, Agent, or Firm* — Nils H. Ljungman & Associates (57) ABSTRACT

A beverage bottle handling machine construction method for constructing a beverage bottle handling machine, such as a beverage bottle cleaning machine, a beverage bottle treating machine, and a beverage bottle shrink wrapping machine in a beverage bottling plant and container handling machines corresponding to the beverage bottle handling machine. The abstract of the disclosure is submitted herewith as required by 37 C.F.R. §1.72(b). As stated in 37 C.F.R. §1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not be interpreted as limiting the claims in any manner.

13 Claims, 6 Drawing Sheets

(51) Int. Cl.
*B23K 37/04* (2006.01)
*B23K 37/047* (2006.01)
*B23P 19/10* (2006.01)
*F16M 5/00* (2006.01)

(56) References Cited

U.S. PATENT DOCUMENTS

| | | |
|---|---|---|
| 4,601,091 A | 7/1986 | Grimm et al. |
| 5,035,046 A | 7/1991 | Cowing |
| 5,217,288 A | 6/1993 | Johnson |
| 6,029,562 A | 2/2000 | Sintchak |
| 7,044,707 B2 | 5/2006 | Garin et al. |
| 2004/0238475 A1 | 12/2004 | Peronek |
| 2005/0155319 A1 | 7/2005 | Greco et al. |

FOREIGN PATENT DOCUMENTS

| | | |
|---|---|---|
| EP | 1 008 510 A | 6/2000 |
| EP | 1 281 471 A | 2/2003 |
| EP | 1 331 059 | 7/2003 |
| EP | 1 403 176 | 3/2004 |
| FR | 2 675 726 | 10/1992 |
| GB | 1601603 | 11/1981 |
| GB | 2 427 175 | 12/2006 |
| JP | 63265780 | 11/1988 |
| JP | 06270797 | 9/1994 |
| JP | 2000229592 | 8/2000 |
| JP | 2003071651 | 3/2003 |
| WO | WO 2008/128607 | 10/2008 |

BEVERAGE BOTTLE HANDLING MACHINE CONSTRUCTION METHOD

CONTINUING APPLICATION DATA

This application is a Continuation-In-Part application of International Patent Application No. PCT/EP2008/005886, filed on Jul. 18, 2008, which claims priority from Federal Republic of Germany Patent Application No. 10 2007 041 521.9, filed on Aug. 30, 2007. International Patent Application No. PCT/EP2008/005886 was pending as of the filing date of this application. The United States was an elected state in International Patent Application No. PCT/EP2008/005886.

BACKGROUND

1. Technical Field

The present application relates to a beverage bottle handling machine construction method for constructing a beverage bottle handling machine, such as a beverage bottle cleaning machine, a beverage bottle treating machine, and a beverage bottle shrink wrapping machine in a beverage bottling plant and container handling machines corresponding to the beverage bottle handling machine.

2. Background Information

Background information is for informational purposes only and does not necessarily admit that subsequently mentioned information and publications are prior art.

The present application relates to a method for producing machines, in one possible embodiment machines for the beverage industry such as cleaning machines, pasteurizing machines, shrink tunnels or the like, wherein the components of the machine are assembled from individual parts using welding methods and detachable connections. In this case a holding device that is not associated with the machine is prepared, one side wall is secured to said holding device and then a second oppositely situated side wall is positioned at a spacing that is slightly greater than the spacing between the side walls once they have been completely assembled. In the following installation step, centrally installed parts are attached between the side walls, at least one of the side walls having support elements by means of which at least a part number of the centrally installed components can be held and/or supported by said support elements. Finally the holding devices are moved towards one another so that the machine is closed and the centrally installed components can then be welded to the side walls using laser beam or electron beam welding methods or can be connected using bonding and riveting methods.

Some machines are completed from a prefabricated frame. The geometries of the machine frame, in this case, are fixed in three spatial directions. The machine parts, modules, bases, motors, etc., are moved into said frame and are connected to said frame in a detachable or non-detachable manner. In addition, a large part of the modules and installed components are welded together and to the side walls.

This type of production is proven, however the it may be difficult to carry out work within the rigid machine frame, the working area available to work in becoming increasingly smaller with each advancement. The cube-like basic frame also presents strict limitations affecting the prefabrication and introduction of more complex modules. The majority of installed components, consequently, have to be assembled together within the base frame. This is time-intensive and arduous for the assembly fitters.

OBJECT OR OBJECTS

Consequently, it is an object of the present application to eliminate, restrict, and/or minimize this defect and to prepare a method of production that makes possible a simplified and quicker assembly.

SUMMARY

This object is achieved by the present application with a method for producing machines, in one possible embodiment machines for the beverage industry, such as cleaning machines, pasteurizing machines, shrink tunnels or the like, which are suitable, in one possible embodiment, for processing containers such as bottles, cans, glasses and the like. In this case the components of the machine are assembled together from individual parts or smaller modules using welding methods and/or detachable connections, wherein at least the following steps are executed:

a) preparing a holding device that is not associated with the machine, said holding device including at least one holding element, by means of which at least one of the side walls of the machine can be supported or carried, b) setting up and aligning at least one part of a first machine side wall, c) setting up and aligning at least one part of a second oppositely situated machine side wall at a spacing that is slightly greater than the spacing between the side walls once they have been completely assembled, d) positioning central components between the side walls, wherein at least one of the side walls has support elements, by means of which at least a part number of the centrally installed components can be held and/or supported by said support elements (installation step), e) closing the machine by pressing together the oppositely situated side faces bridged by the centrally installed components (closing step), and f) welding at least one part of the centrally installed components to the side faces, wherein in one possible embodiment a laser beam or electron beam welding method is used, g) wherein at least one central component is connected to at least one side wall and in one possible embodiment to two side walls using a bonding and riveting method.

Normally speaking the centrally installed components are secured to the side walls using the same or extensively the same methods. In this case, in one possible embodiment a one-sided rivet system and method is used for the bonding and riveting method, where the rivets are acted upon from one side by means of a riveting tool. Examples for this are pop riveting or connections made using a locking eyebolt.

In this case, in conjunction with said method and the device, the terms central components and/or centrally installed components refer to such elements that bridge, substantially in a self-supporting manner, the spacing between one side wall and the other side wall, or respectively the support elements provided at that location. Other stationary or moveable installed components that are to be seen in a method and machine or this type, are not looked at or referred to in any more detail below. Normally speaking, the centrally installed components themselves are prefabricated modules that comprise a plurality of individual components.

A dual component epoxy resin system can be used, for example, as the adhesive for the bonding and riveting method, also being known as "plastic steel." These adhesives have a resin component and a hardening component in a suitable mixing ratio, wherein, in dependence on the material to be treated and the adhesive task associated therewith, metal additives such as steel or aluminum powder or mineral fillers can be added to the resin component. The necessary or desired hardener to be used in dependence on the specific application determines the viscosity and the hardening method of the bonding system.

In at least one possible embodiment of the present application, no local heat input is necessary and/or desired and the riveting presses the faces to be bonded together in a positive locking manner so that they are gas-tight and liquid tight. This type of bond/rivet connecting is clearly less costly than large-surface vertical laser welding.

An improvement is provided in that the centrally installed components are secured first in step d) to one of the two side walls. This can be effected using suitable screw-type or rivet connections as well as a suitable welding process. To avoid, restrict, and/or minimize heat-induced deformation, a beam method is used, such as, for example, a laser beam welding method or in one possible embodiment a bonding and riveting method analogous to step g). In the region of the oppositely situated side wall, which is at a small spacing from the free ends of the centrally installed components, the centrally installed components rest loosely on the support elements provided at that location. In this way, the working area remains freely accessible up until the end of the assembly procedure in step f) or g) and additional centrally installed components can easily be added and interconnected and/or welded. The one-sided securing of the centrally installed components on the first side wall, in this case, can be effected in a selective manner and/or at a later time. It is sensible, for example, to weld very large and heavy centrally installed components in an individual manner and after the closing step to weld the remaining centrally installed components in a continuous welding process or to perform a bonding/riveting procedure. In one specific embodiment of the method, the centrally installed components that are to be connected using a bonding/riveting method have end face elements on the outer edges or outer sides. Said end face elements can be but welded or welded in another suitable manner in a separate process, for example on a laser welding device. When installed, said end face elements are aligned parallel or substantially parallel to the side faces of the machine to be constructed. The outside faces of the end face elements are then coated completely or partially with an adhesive before being assembled onto one of the outside or side walls. For applying the necessary and/or desired pressing force and accurate securing during the hardening stage, a permanent or substantially permanent connection is created by means of the riveting method or at least one rivet connection. In one possible embodiment of the present application, a plurality of rivets distributed uniformly over the face to be pressed is provided.

An improvement in and shortening of the method is provided in that during the entire hardening phase or intermittently during the hardening phase, the regions of the side wall in contact with the end face elements are heated from the rear side of the side walls. In one possible embodiment, hot air blowers or flameless heaters are used for this purpose.

In a method variant, screws are used instead of rivets in order to produce the necessary and/or desired contact pressure. This is first and foremost relevant when centrally installed components that are installed or positioned at one of the ends of the machine are easily obtainable from both sides of the outer or side wall.

The method can be improved by locking eyebolts being used in principle as rivets, by means of which locking eyebolts high clamping forces can be applied to the faces and components to be connected. Said locking eyebolt comprises a bolt and a locking ring, the bolt having a head and a shaft that is at least partially corrugated. Once the bolt has been inserted into the elements to be connected, the locking ring is guided over the shaft and engaged on one side with a setting tool, pressed onto the surface of the element to be connected and then subsequently pressed into the grooves or corrugation in a cold forming manner (setting process). As the final method step, the shaft is separated at a predetermined breaking point above the locking ring. Using suitable setting tools, for instance hydraulic or hydro-pneumatic setting tools and corresponding clamping rings bolt, pre-tensioning of more than 17 kiloNewtons per bolt can be achieved. In one possible embodiment, a pre-tensioning force of three or more kiloNewtons is applied.

Depending on the respective production possibilities, at least part of the weld connections can be performed from outside through the side wall by the centrally installed components that are lying in the interior of the machine in a flush or co-planar manner being welded to the wall, from the outside, through the container wall and/or being welded to one another, which accelerates the assembly procedure even more as these types of weld procedures can be performed in an easily accessible position and/or in an automatic manner.

In order to attain a lightweight construction that does not use much material, another variant of the method has the first side wall formed from substantially two parallel or substantially parallel elements. These comprise an inner wall and an outer wall, which are spaced apart and interconnected by webs. In one possible embodiment the inside wall has a plurality of recesses and openings, through which the support elements can be guided and/or the inner and outer wall can be interconnected. In this case the support elements protrude into the interior space of the machine so that the centrally installed elements can be carried and/or supported in accordance with step d).

In at least one possible embodiment of the present application, in a first step, the support elements are secured to the outer wall or are connected to said wall and then the inner wall is pushed onto the support elements.

In the case of an improved method, recesses and openings in the side walls are produced by means of a beam method and in one possible embodiment by means of an electron beam or a laser beam method. These laser beam or electron beam methods for cutting the material are very precise or substantially precise so that no re-machining or almost no re-machining is necessary and/or desired and the half-finished products produced automatically are able to be installed directly.

For improving the device and for controlling the assembly procedure, it is helpful if, before the installation in step b) and/or c), dimensions and/or tear lines are applied at least on one of the side walls by using electron beam and/or laser beam welding. This can be effected in one operating step when the openings and recesses are beam cut and consequently extends the processing very little.

In an optimized method variant, the centrally installed components are prefabricated as far as possible from components that comprise a plurality or a large number of individual parts. In one possible embodiment of the present application, gas-conducting and/or fluid-conducting false floors can be mounted as finished parts. Small openings in the side faces, which, have to be provided, where applicable, for accommodating support elements, are subsequently welded in a sealing manner from outside through the side wall. In one possible embodiment of the present method, the centrally installed components and other installed components of the machine can be installed essentially one after the other from the bottom upwards and the head room remains accessible up until the closing step so that it is possible to use lifting and crane tools in a supporting manner up until the end of the assembly procedure.

The present application also relates to a machine for the beverage industry and foodstuffs industry, in one possible embodiment a cleaning machine, a pasteurizing machine, a shrink tunnel or the like, which are suitable in one possible embodiment for the processing of containers such as bottles, cans, small casks, glasses and the like. Said machine comprises at least one segment that has been produced according to one of the preceding method variants. In one possible embodiment of the present application, the machine comprises a plurality of segments that have been produced at the same time or one after the other in accordance with a method according to the present application.

In this case said machine includes a plurality of support elements, on which at least part of the centrally installed components rest or are supported with at least one part face. In one variant of the machine, at least a part number of the support elements has a web region and a carrier region, in one possible embodiment the support elements having a thread or a rivet head at least at one end. In this case, at least with part of the centrally installed components, end face elements are provided on the outer edges or regions pointing to the side wall of the machine and between said end face elements and the respective side wall an adhesive is provided at least on part faces, said end face elements being secured on at least one side face by means of at least one rivet. In at least one possible embodiment of the present application, a plurality of rivets is provided per end face element.

In one variant of the method and with an improved device form, the centrally installed components are secured to the side wall exclusively using a bonding and riveting method, laser welding from outside through the side wall is omitted entirely.

In addition, the present application includes a device for producing machines for the beverage industry and foodstuffs industry, in one possible embodiment a cleaning machine, a pasteurizing machine, a shrink tunnel or the like, which are suitable for the processing of containers, such as bottles, cans, glasses and the like, with which the accomplishment of one of the preceding method variants is made possible. To this end, the device has a base element and one lateral support frame for a single or two-layer side wall of the machine. In addition, an installation template is attached to the at least one support frame and at least one carrier or support element is positioned on said support frame in order to secure the side wall.

As an alternative, the device includes two oppositely situated support frames and at least one base element in order to accommodate two side walls. To this end, in one possible embodiment, an installation template is also attached to the second support frame and at least one carrier or support element is positioned on said second support frame, in one possible embodiment a plurality of carrier or support elements being provided.

In at least one possible embodiment of the present application, different machines or machine sections/segments can be mounted on one and the same support frame or pair of support frames in which the respectively correspondingly installation templates are provided.

In order to move the side walls towards each other in the closing step and to close the gaps to the free ends of the centrally installed components, in one possible embodiment, the one support frame or at least one of the support frames can be driven. As an alternative, at least one of the installation templates can be mounted on the support frame or the support frames so as to be driveable.

In at least one possible embodiment of the present application, the one support frame or at least one of the support frames is guided by at least one rail.

The production method according to the present application, the machine and the production device are explained by way of examples without being limited to one possible embodiment.

The above-discussed embodiments of the present invention will be described further herein below. When the word "invention" or "embodiment of the invention" is used in this specification, the word "invention" or "embodiment of the invention" includes "inventions" or "embodiments of the invention", that is the plural of "invention" or "embodiment of the invention". By stating "invention" or "embodiment of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

DESCRIPTION OF EMBODIMENT OR EMBODIMENTS

Figure 1:
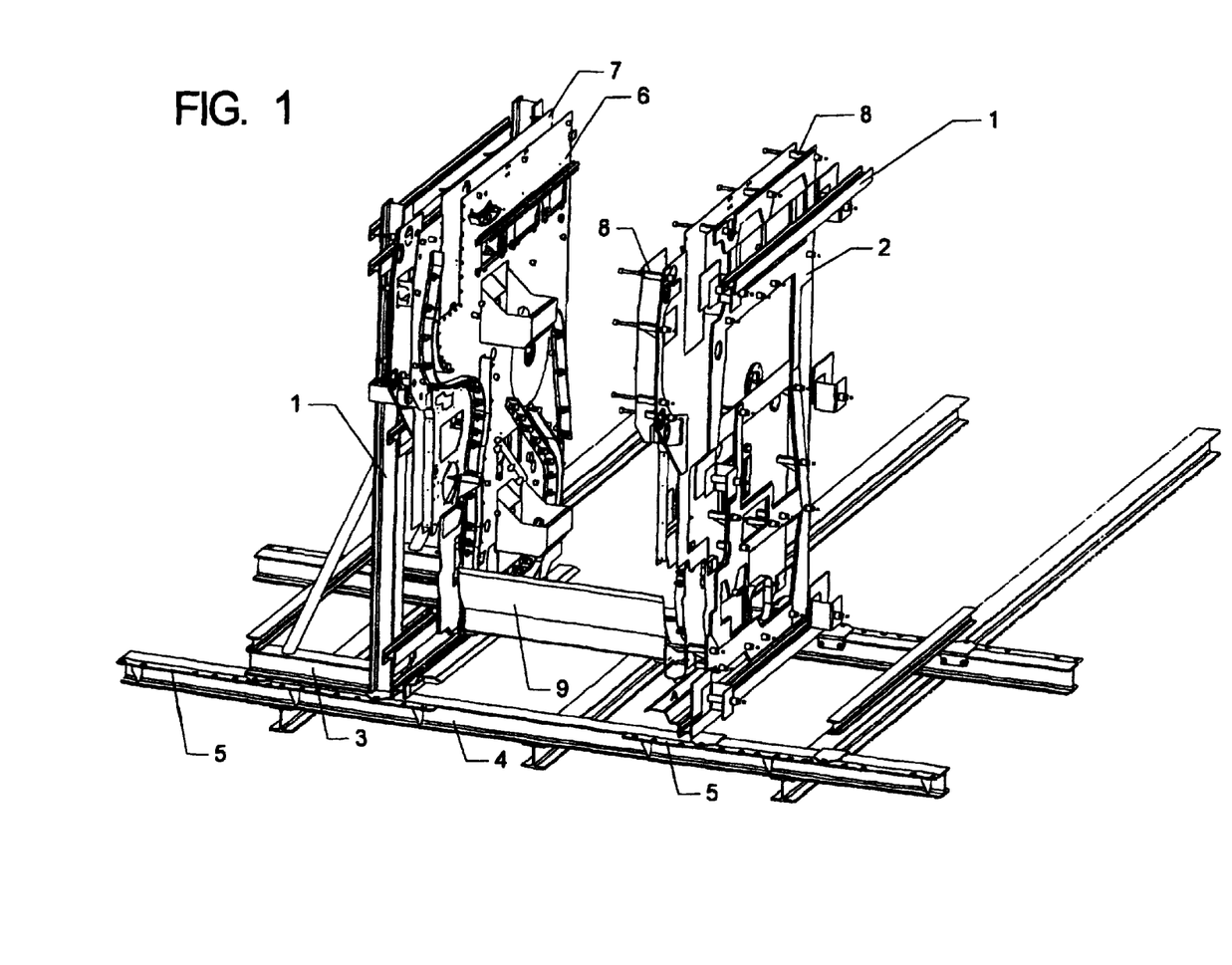
FIG. 1 shows a perspective representation of the support frame at the beginning of the assembly step of a cleaning machine.
Figure 1A:
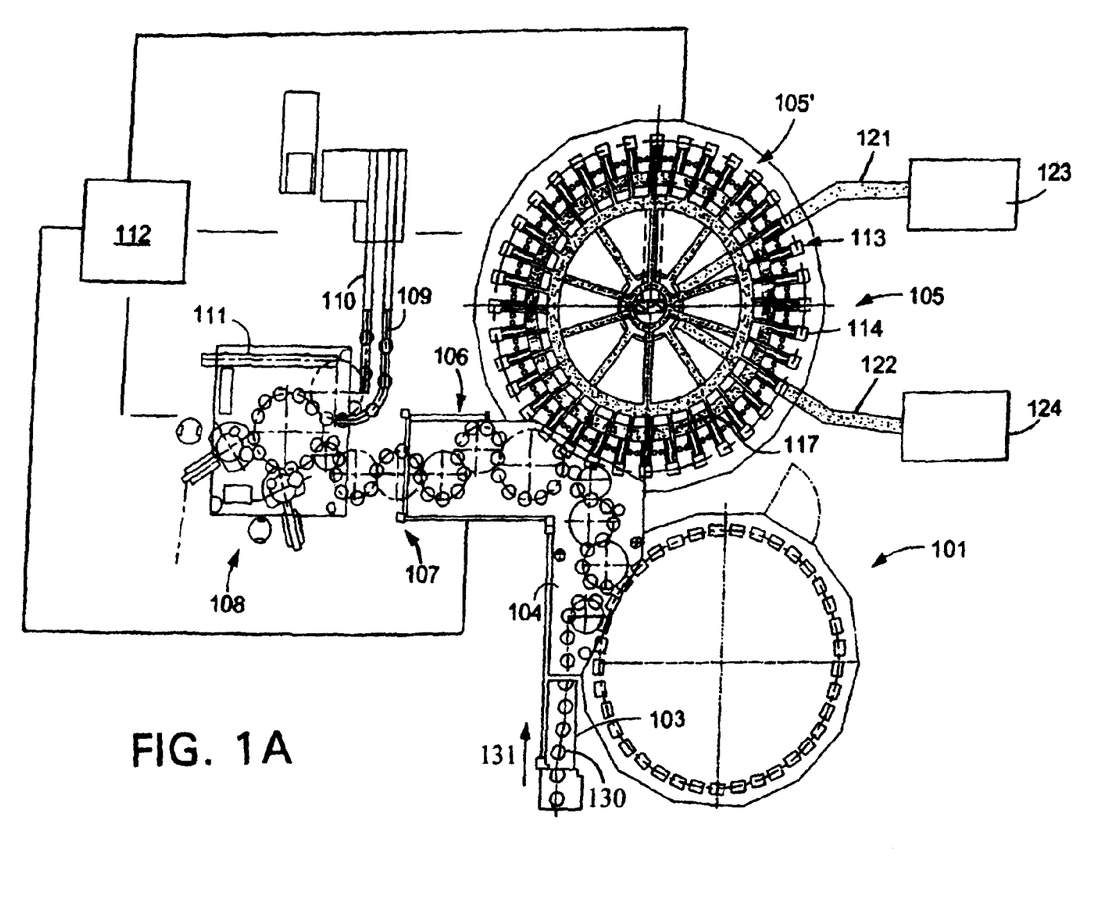
FIG. 1A shows schematically the main components of one possible embodiment example of a system for filling containers, for example, a beverage bottling plant for filling bottles with at least one liquid beverage, in accordance with at least one possible embodiment, in which system or plant could possibly be utilized at least one aspect, or several aspects, of the embodiments disclosed herein.

FIG. 1A shows schematically the main components of one possible embodiment example of a system for filling containers, specifically, a beverage bottling plant for filling bottles 130 with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles 130, are fed in the direction of travel as indicated by the arrow 131, by a first conveyer arrangement 103, which can be a linear conveyor or a combination of a linear conveyor and a starwheel. Downstream of the rinsing arrangement or rinsing station 101, in the direction of travel as indicated by the arrow 131, the rinsed bottles 130 are transported to a beverage filling machine 105 by a second conveyer arrangement 104 that is formed, for example, by one or more starwheels that introduce bottles 130 into the beverage filling machine 105.

The beverage filling machine 105 shown is of a revolving or rotary design, with a rotor 105', which revolves around a central, vertical machine axis. The rotor 105' is designed to receive and hold the bottles 130 for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles 130 to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle 130, the first product or the second product can be filled by means of an appropriate control of the filling product or fluid valves.

Downstream of the beverage filling machine 105, in the direction of travel of the bottles 130, there can be a beverage bottle closing arrangement or closing station 106 which closes or caps the bottles 130. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles 130. In the embodiment shown, the labeling arrangement 108 is connected by a starwheel conveyer structure to three output conveyer arrangements: a first output conveyer arrangement 109, a second output conveyer arrangement 110, and a third output conveyer arrangement 111, all of which convey filled, closed, and labeled bottles 130 to different locations.

The first output conveyer arrangement 109, in the embodiment shown, is designed to convey bottles 130 that are filled with a first type of liquid beverage supplied by, for example, the supply reservoir 123. The second output conveyer arrangement 110, in the embodiment shown, is designed to convey bottles 130 that are filled with a second type of liquid beverage supplied by, for example, the supply reservoir 124. The third output conveyer arrangement 111, in the embodiment shown, is designed to convey incorrectly labeled bottles 130. To further explain, the labeling arrangement 108 can comprise at least one beverage bottle inspection or monitoring device that inspects or monitors the location of labels on the bottles 130 to determine if the labels have been correctly placed or aligned on the bottles 130. The third output conveyer arrangement 111 removes any bottles 130 which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

FIG. 1 shows the device according to the present application with two support frames 1, on which are secured installation templates 2, which in their turn support side walls. The device is represented at the beginning of the method step d), the installation step during the assembly of a cleaning machine.

Each support frame 1 has a base part 3 which stands on a common support and rail structure 4, the right support frame not being completely represented for reasons of clarity. The support frame 1 with the base part 3 is mounted so as to be displaceable in the direction of the oppositely situated support frame 1 and can be secured in different positions on a perforated strip secured to the support and rail structure 4. The side walls comprise an inner wall 6 and an outer wall 7, the inner wall 6 being held at a spacing from the outer wall 7 by means of a plurality of support elements 8. In the variant shown, the support elements 8 include at their outer end a thread (not represented) so that during the mounting procedure the outer wall 8 can be screw-connected to the installation template 2 and/or the support frame 1.

In addition, FIG. 1 shows a centrally installed component 9, which abuts against the first side wall or the inner wall 6 and has been screw-connected to said wall in a manner not shown also by means of the support elements 8. The free end of said centrally installed component 9 rests on the free end of a support element 8 protruding out of the right side wall at a spacing A, represented as a welded bracket.

After installing the centrally installed components 9, the right support frame 1 is pushed on the rail 4 in the direction of the oppositely situated support frame 1 until the centrally installed components fit in a positive locking manner at both ends and can be welded. Laser welding is carried out in the example shown here as far as possible from the outside, the outer wall 7 having large access openings for this purpose. Said access openings are subsequently partially closed.

Figure 2:
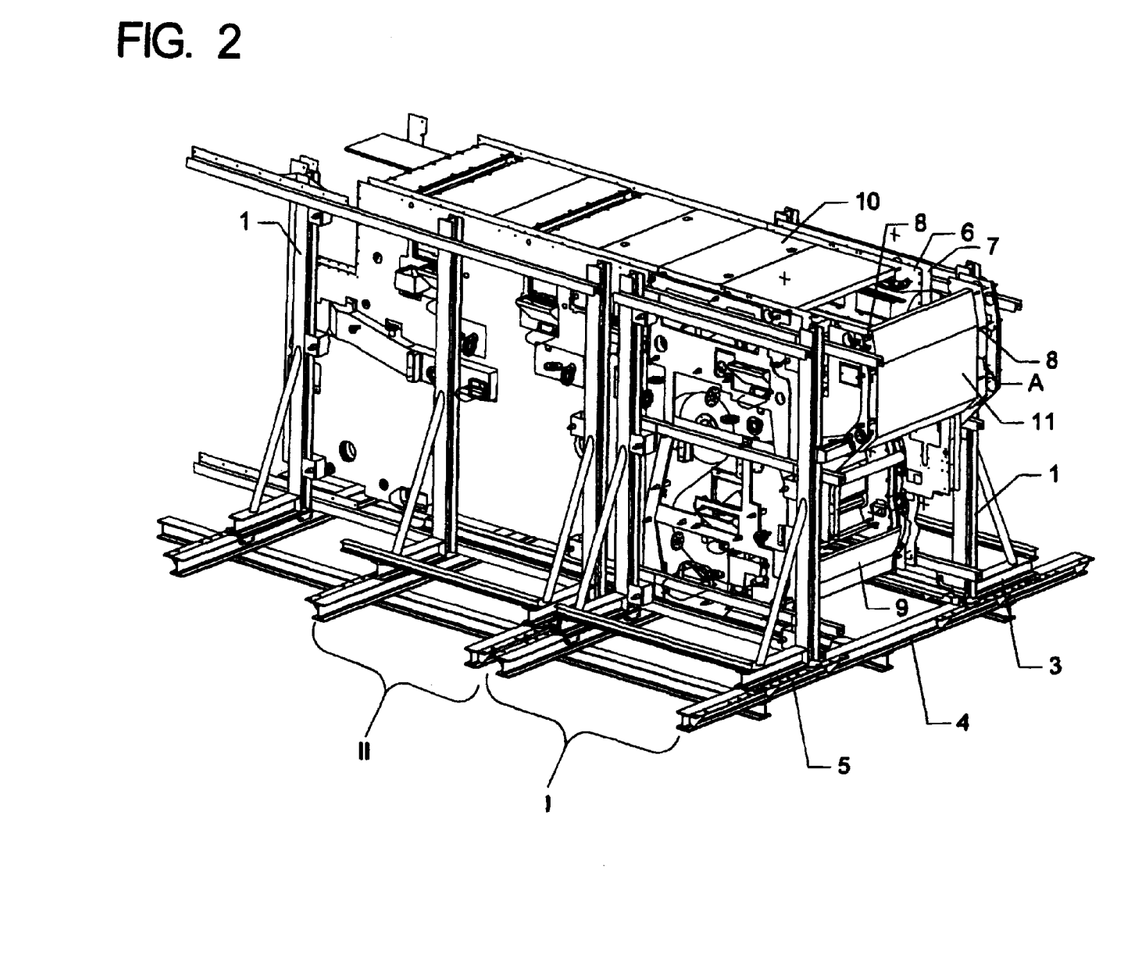
FIG. 2 shows a perspective representation of a section-by-section production of a cleaning machine.

The cleaning machine represented in FIG. 2 is shown just before completion. Said cleaning machine has been produced section-by-section according to the aforementioned principle. The last segment I shown is already closed at the top, the cover component 10 and the front component 11 resting in an easily recognizable manner on the free ends of the protruding support elements 8. The cleaning machine is completed in segment II and additional segments and is no longer connected to the support frame, the installation templates 2 in these segments have also been removed.

Figure 3:
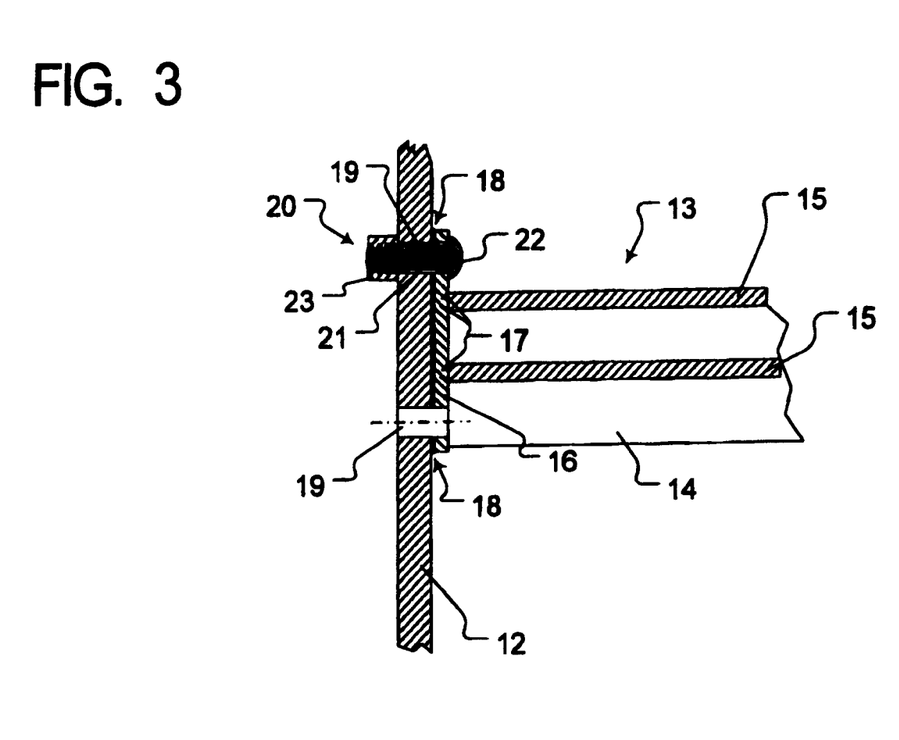
FIG. 3 shows a sectional drawing through a bond/rivet connection between an outside wall or side wall and a centrally installed component.

FIG. 3 shows a sectional drawing through a simple side wall or outer wall 12 and a centrally installed component 13. The centrally installed component 13 comprises a bottom plate 14 and two horizontal partition plates 15 which are substantially oriented at right angles to the side wall or outer wall 12 of the machine. End face elements 16 are positioned at the outer end of the bottom plate 14 and of the partition plates 15, one of which being represented. The end face elements 16 have been connected to the bottom plate 14 and the partition plates 15 using a laser welding method, the laser weld seams 17 being indicated in FIG. 3. The adhesive 18 is applied between end face element 16 and side wall or outer wall 12, said adhesive being represented as a thicker continuous line. The side wall or outer wall 12 and the end face element 16 have openings 19 through which the clamping ring bolts 20 with the shaft 21 are guided. One clamping ring bolt 20 is shown as an example, a plurality of openings and clamping ring bolts 20 being provided per end face element 16. The clamping ring bolt 20 has been guided from inside to outside through the opening 19 so that the bolt head 22 is positioned in the interior of the machine and the corrugated end of the shaft 21 extends outwards and is surrounded in a friction-locking and form-locking manner by the clamping ring 23. The installation situation of the clamping ring bolt 20 represented in FIG. 3 shows said bolt after countersinking.

Figure 4:
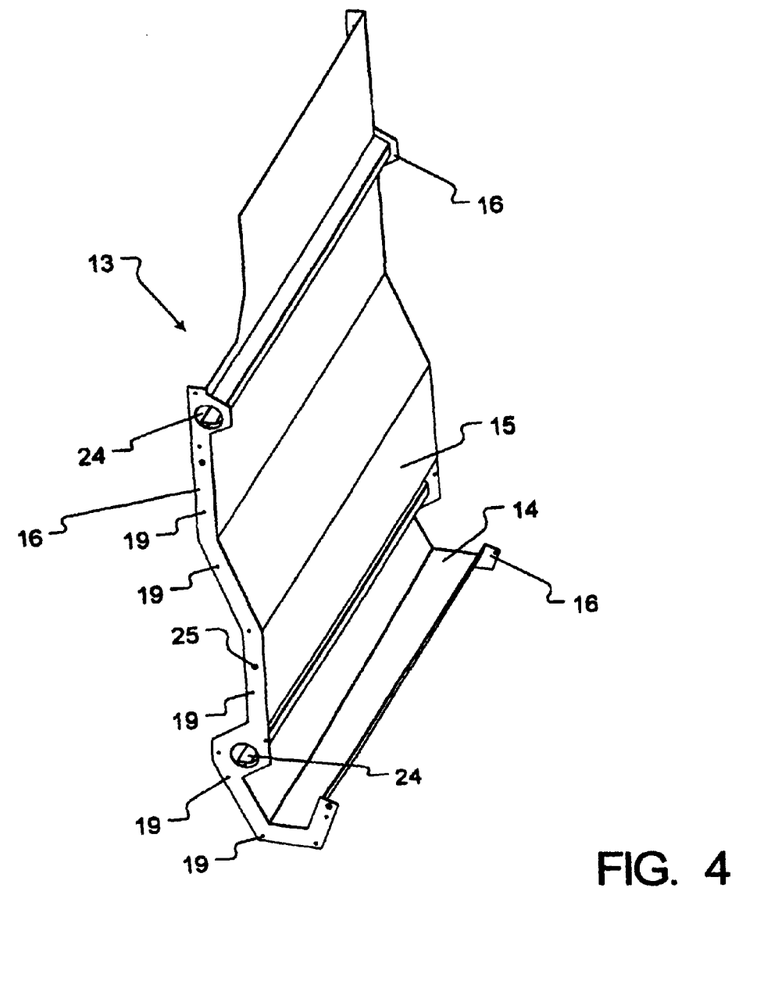
FIG. 4 shows a perspective representation of a centrally installed component.

FIG. 4 is a perspective representation showing a simple centrally installed component 13, in the form of partition and bottom plate 14 and 15 with multiple bends with a few additional functional elements. The end face elements 16 are but welded to the outer edges. A plurality of openings 19 can be seen in the end face elements 16, the bolts being guided through said openings in order to be connected to the outer wall or side walls (not represented). In addition, supply openings and disposal openings 24 and positioning openings 25 can be seen. As described above, the positioning openings accommodate the support elements during the mounting procedure for holding and positioning the centrally installed components at a spacing.

One possible effect of the end face elements is consequently clear, providing a larger structural degree of freedom for the arrangement of the support elements if the centrally installed components have end face elements, as a very large area of the end face elements is available for arranging the positioning openings.

In the present example, the adhesive used was a so-called plastic steel on an epoxy resin base with metal filler constituents and clamping ring bolts with a pre-tensioning force of about 8 kiloNewtons. The hardening time was accelerated using an infrared heat source.

It is obvious that the method and the production device can be used for a machine of arbitrary length.

In one possible embodiment of the present application, the machines may be assembled and then pushed together to produce a machine, such as a cleaning machine, pasteurizing or treating machine, or a shrink wrapping machine. To hold the pieces of the machine together, an adhesive or glue or epoxy may be applied to the centrally installed components or middle structural parts 9 at the juncture or meeting place with the side walls. In order to minimize and/or reduce the thickness of the layer of adhesive, the centrally-installed components or middle structural parts 9 may then be riveted and/or screwed into place against the side walls. The force and/or pressure of the rivets may hold the middle structures 9 in place. The adhesive may additionally hold the middle structures 9 in place in the formed machine. The adhesive and rivets and/or screws may hold the machine together sufficiently to minimize movement and permit a substantially accurate welds of a sufficient strength.

Figure 5:
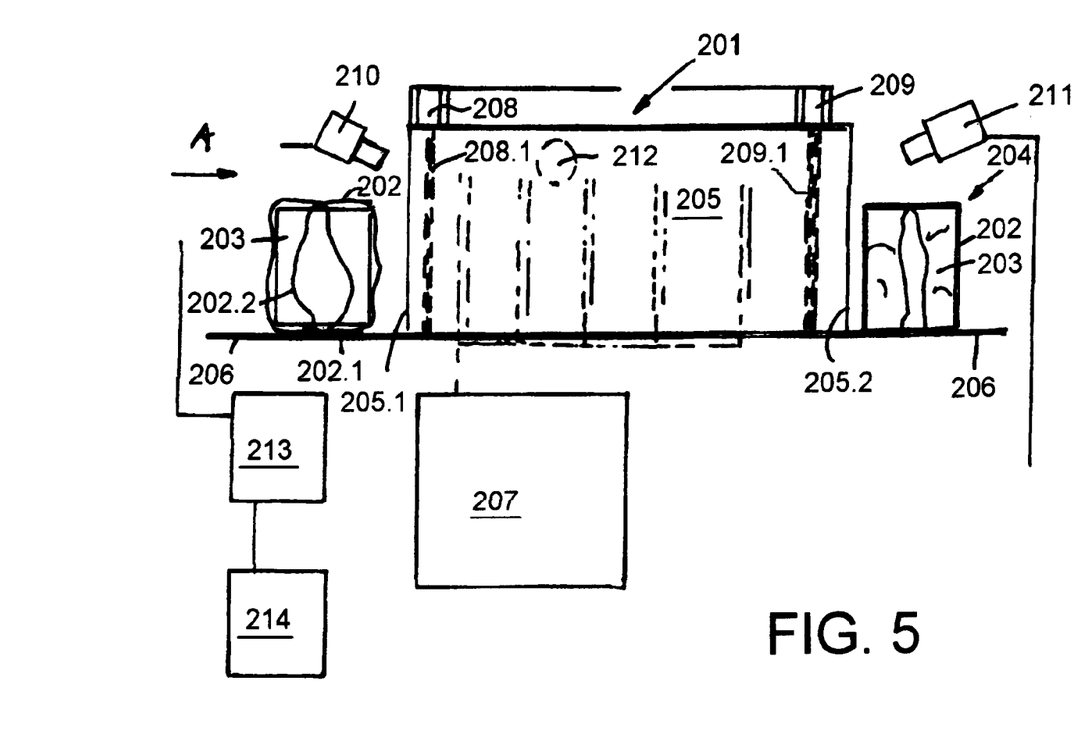
FIG. 5 is a simplified schematic side view of a shrink tunnel of a shrink wrap packaging plant.

In FIG. 5, the number 201 designates in general the shrink tunnel of a shrink packager, i.e. of a plant for the shrinking of a shrink film 202 over a pack formation 203, and in at least one possible embodiment, for example, for the formation of packaging units or trading units 204 in which the individual packages that form the pack formation 203 can be held together by the shrunk shrink film 202.

The shrink tunnel 201 forms a tunnel interior 205 which is enclosed from the outside by a tunnel wall. The pack formations 202 which have already been wrapped with the shrink film 202 are moved through the tunnel interior 205 for the shrinking of the shrink film 202 under the action of heat and/or for the formation of the trading unit 204 by means of a conveyor, such as a conveyor belt 206, for example. For this purpose, the tunnel interior 205 is filled with hot air by a heating device 207, so that the temperature of at least two hundred degrees Celsius which is necessary and/or desired for the shrinking of the shrink film can be achieved.

At the tunnel entrance 205.1, from which the pack formation 203 provided with the shrink film 202 is moved by means of the conveyor 206 into the tunnel interior 205, and at the tunnel exit 205.2, at which the trading units 204 exit the tunnel interior 205, devices 208 and 209 respectively are provided on the upper side of the tunnel entrance and exit, and by means of which, by a vertical or essentially vertical flow of heated air, an air curtain 208.1 or 209.1 respectively is produced, and in at least one possible embodiment to close off or to enclose the tunnel interior 205 at the tunnel entrance 205.1 and tunnel exit 205.2.

For example, the devices 208 and 209 comprise essentially one or more slotted air discharge openings and corresponding blowers, which can be supplied with hot air from the heater device 207, for example. Outside the tunnel interior, a plurality of cameras 210 and 211 are provided, by means of which the tunnel interior 205 and/or the shrinking process that is taking place there can be monitored through the tunnel entrance 205.1 and the tunnel exit 205.2 respectively, and in one possible embodiment through the respective air curtains 208.1 and 209.1.

In the embodiment of the present application illustrated in FIG. 5, a video camera 210 is provided at the tunnel entrance 205.1 and at a sufficient distance from said entrance, and an additional video camera 211 is provided at the tunnel exit 205.2 at a sufficient distance from said exit, for example at a distance of one and half meters to two meters. Heat-resistant electric lamps 212 are used to illuminate the tunnel interior 205, although one of these lamps 212 is shown in FIG. 5 to simplify the illustration.

Through the air curtain 208.1, the video camera 210 monitors or optically records (for display) the first portion of the tunnel interior 205 adjacent to the tunnel entrance 205.1 in the direction of transport A, in which (portion of the tunnel) the decisive steps of the shrinking process take place, namely the sealing of the overlapping segments 202.1 of the shrink film 202 underneath the individual pack formation 203, the inflation of the shrink film over the lateral shrink holes 202.2 that are formed during the wrapping of the individual pack formation 203 and the initiation of the actual shrinking process by heating the individual piece of shrink film, in one possible embodiment on its inner surface that faces the respective pack formation 203. These initial steps of the shrinking process which are monitored or photographed by the video camera 210 already have a decisive effect on the subsequent optical appearance of the trading units 204 and/or the quality of the shrinking process. The step that immediately or substantially immediately follows these first steps of the shrinking process is the final shrinking of the shrink film. The video camera 211, through the air curtain 209.1, photographs the section of the tunnel interior 205 in the direction of transport A preceding the tunnel exit 205.2 and thus also the pack formations 203 or trading units 204 with the shrunk-on shrink film as well as the quality of the individual shrinking process.

The video cameras 210 and 211 are components of a camera or monitoring system which makes possible a variety of applications of the images taken by the cameras 210 and 211, e.g. among other things a display of the images on monitors 214, so that on the basis of these images, among other things, an optimal control of the shrinking process or an optical regulation of the shrink tunnel 201 and/or of the packing line of which this tunnel is a part becomes possible, in one possible embodiment including in the event of an exchange or replacement of the shrink film and/or a change in format, etc.

It is also possible to transmit images supplied by the cameras 210 and 211 that comprise information about errors that occur during the shrinkage process via the camera system 213 and a data transmission system, such as an Internet connection, for example, to a service company that is spatially or geographically remote from the process, such as to the service department of the manufacturer of the shrink tunnel 201, for example, to thereby receive a fast and targeted error analysis that makes it possible to resolve the error that has occurred.

For example, in at least one possible embodiment of the present application, several adjustments may be made to either, or both of, the shrink wrapping machine and the shrink tunnel 201 to alter the wrapped packaging units 204. In one possible embodiment, the speed of the conveyor 206 may be adjusted to a higher speed or a lower speed. This may influence the amount of time the packaging unit 204 spends in the shrink tunnel 201. Also, another adjustment may be made to the temperature of the shrink tunnel 201. The heating device 207 may either increase or decrease its output, and the air curtain-producing devices 208 and 209 may produce air curtains of differing temperatures, depending on the adjustments needed to be In at least one possible embodiment of the present application, the images recorded by the camera system during the shrinking process are transmitted directly, i.e. without any delay, to the other location, so that the shrinking process can be modified and monitored directly from this remote location. A technician skilled in the art speaks of a data transmission with no delay as an on-line transmission.

It is also possible to store the images or image data supplied by the cameras 210 and 211 for documentation purposes, so that these data can be retrieved if necessary and/or desired.

The above description assumes that two cameras 210 and 211 are provided outside the tunnel interior 205. Of course, there may also be a greater number of cameras and/or it may be sufficient to monitor the first portion of the tunnel interior 205.1 that is downstream of the tunnel entrance 205.1 in the direction of transport A, which is the portion of the tunnel in which the essential steps of the shrinking process occur, with one or with a plurality of cameras.

One feature or aspect of an embodiment is believed at the time of the filing of this patent application to possibly reside broadly in a method for producing machines, in one possible embodiment machines for the beverage industry, such as cleaning machines, pasteurizing machines, shrink tunnels or the like, wherein the components of the machine are assembled from individual parts and/or modules using welding methods and detachable connections, wherein at least the following steps are executed:

a) preparing a holding device that is not associated with the machine, said holding device including at least one holding element, by means of which at least one of the side walls of the machine can be supported or carried, b) setting up and aligning at least one part of a first machine side wall, c) setting up and aligning at least one part of a second oppositely situated machine side wall at a spacing that is slightly greater than the spacing between the side walls once they have been completely assembled, d) positioning central components between the side walls, wherein at least one of the side walls has support elements, by means of which at least a portion of the number of the centrally installed components can be held and/or supported by said support elements, e) closing the machine by pressing the oppositely situated side faces together and f) welding at least one part of the centrally installed components to the side faces, wherein in one possible embodiment a laser beam or electron beam welding method is used, wherein at least one central component is connected to at least one side wall and to two side walls using a bonding and riveting method.

Another feature or aspect of an embodiment is believed at the time of the filing of this patent application to possibly reside broadly in the method, wherein the riveting method is a one-sided riveting method, where the rivets are acted upon from one side by means of a riveting tool, as for the riveting of a pop rivet or a locking eyebolt.

Yet another feature or aspect of an embodiment is believed at the time of the filing of this patent application to possibly reside broadly in the method, wherein in step d) the centrally installed components are first secured to one of the two side walls and are held loosely by the support elements of the second oppositely situated side wall that is situated at a small spacing from first said wall.

Still another feature or aspect of an embodiment is believed at the time of the filing of this patent application to possibly reside broadly in the method, wherein at least part of the weld connections is effected by the centrally installed components arranged in a flush manner in the interior of the machine being welded from the outside through the container wall onto said wall and/or being welded together.

A further feature or aspect of an embodiment is believed at the time of the filing of this patent application to possibly reside broadly in the method, wherein the centrally installed components to be connected by means of a bonding and riveting method have end face elements on the outside edges parallel or extensively parallel to the side wall, said end face elements being at least partially welded to the centrally installed components, and, the outer faces, with reference to the centrally installed components, of the end face elements being at least partially coated with an adhesive before the step e).

Another feature or aspect of an embodiment is believed at the time of the filing of this patent application to possibly reside broadly in the method, wherein the pressing of the bonded connection between side wall and end face element to create the necessary and/or desired adhesive and holding force is effected by means of the riveting method or respectively by means of a rivet joint.

Yet another feature or aspect of an embodiment is believed at the time of the filing of this patent application to possibly reside broadly in the method, wherein the regions of the side walls in contact with the end face elements are heated intermittently from the rear side of the side walls, wherein in one possible embodiment a hot air blower or a flameless heater is used.

Still another feature or aspect of an embodiment is believed at the time of the filing of this patent application to possibly reside broadly in the method, wherein the first side wall comprises substantially two parallel or substantially parallel elements, an inner wall and an outer wall, wherein the inner wall has a plurality of recesses and openings, through which the support elements can be extended and/or the inner and outer wall can be interconnected and which can carry and/or support the centrally installed components in accordance with step d).

A further feature or aspect of an embodiment is believed at the time of the filing of this patent application to possibly reside broadly in the method, wherein in a first step the support elements are secured to the outer wall or are connected to said outer wall and the inner wall is then pushed onto the support elements.

Another feature or aspect of an embodiment is believed at the time of the filing of this patent application to possibly reside broadly in the method, wherein before being assembled together, the side walls have recesses and openings and at least part of the recesses and openings are produced in the side walls by using a beam method and in one possible embodiment by using an electron beam method or a laser beam method.

Yet another feature or aspect of an embodiment is believed at the time of the filing of this patent application to possibly reside broadly in the method, wherein before the installation in step b) and/or c), dimensioning and/or tear lines are admitted at least on one of the side walls by using an electron beam method and/or a laser beam method.

Still another feature or aspect of an embodiment is believed at the time of the filing of this patent application to possibly reside broadly in the method, wherein the centrally installed components are prefabricated components comprising a plurality or a large number of individual parts.

A further feature or aspect of an embodiment is believed at the time of the filing of this patent application to possibly reside broadly in the method, wherein the centrally installed components and other installed components of the machine are substantially installed from the bottom upwards.

One feature or aspect of an embodiment is believed at the time of the filing of this patent application to possibly reside broadly in the method, wherein the centrally installed components are secured to the side walls exclusively by means of a bonding and riveting method.

Another feature or aspect of an embodiment is believed at the time of the filing of this patent application to possibly reside broadly in the method, wherein screw-type connections are provided at least partially in the place of rivet connections.

Yet another feature or aspect of an embodiment is believed at the time of the filing of this patent application to possibly reside broadly in the method, wherein the at least one rivet is a locking eyebolt and in one possible embodiment a locking eyebolt that has at least one groove, in one possible embodiment a plurality of grooves on its outer contour.

Still another feature or aspect of an embodiment is believed at the time of the filing of this patent application to possibly reside broadly in the method, wherein the rivet is pre-tensioned with a force of more than 3 kiloNewtons.

A further feature or aspect of an embodiment is believed at the time of the filing of this patent application to possibly reside broadly in the method, wherein the adhesive includes an epoxy resin.

Another feature or aspect of an embodiment is believed at the time of the filing of this patent application to possibly reside broadly in the method, wherein the adhesive includes epoxy resin as a main component and in addition metal or ceramic substances.

Yet another feature or aspect of an embodiment is believed at the time of the filing of this patent application to possibly reside broadly in machines for the beverage industry and foodstuffs industry, in one possible embodiment cleaning machines, pasteurizing machines, shrink tunnels or the like, wherein said machines have at least one segment that has been produced in accordance with a method according to the present application and in one possible embodiment the machine has a plurality of segments that have been produced at the same time or one after the other in accordance with a method according to the present application Still another feature or aspect of an embodiment is believed at the time of the filing of this patent application to possibly reside broadly in the machine, wherein said machine includes a plurality of support elements, on which at least part of the centrally installed components rests with at least one part face.

A further feature or aspect of an embodiment is believed at the time of the filing of this patent application to possibly reside broadly in the machine, wherein said machine includes at least one double side wall and at least a portion of the number of the support elements includes a web region and a support region.

Another feature or aspect of an embodiment is believed at the time of the filing of this patent application to possibly reside broadly in the machine, wherein at least part of the centrally installed components have end face elements on the outer edges or regions pointing to the side wall of the machine and an adhesive is provided between said end face elements of the respective side wall at least on part faces and said end face elements are secured by means of at least one rivet on at least one side face.

Yet another feature or aspect of an embodiment is believed at the time of the filing of this patent application to possibly reside broadly in the machine, wherein the support elements have a thread at least at one end.

Still another feature or aspect of an embodiment is believed at the time of the filing of this patent application to possibly reside broadly in the machine, wherein the support elements have a rivet head at least at one end.

A further feature or aspect of an embodiment is believed at the time of the filing of this patent application to possibly reside broadly in the machine, wherein the centrally installed components are connected to the side wall by means of adhesive and rivets.

One feature or aspect of an embodiment is believed at the time of the filing of this patent application to possibly reside broadly in a device for producing machines for the beverage industry and foodstuffs industry, in one possible embodiment a cleaning machine, pasteurizing machines, shrink tunnels for containers such as bottles, glasses and the like, wherein said device is suitable for executing a method according to the present application.

Another feature or aspect of an embodiment is believed at the time of the filing of this patent application to possibly reside broadly in the device, wherein said device has a base element and one side support frame for a single or two-layer side wall.

Yet another feature or aspect of an embodiment is believed at the time of the filing of this patent application to possibly reside broadly in the device, wherein an installation template is attached to the at least one support frame and at least one carrier or support element is positioned on said support frame.

Still another feature or aspect of an embodiment is believed at the time of the filing of this patent application to possibly reside broadly in the device, wherein said device has two oppositely situated support frames and at least one base element.

A further feature or aspect of an embodiment is believed at the time of the filing of this patent application to possibly reside broadly in the device, wherein an installation template is also attached to the second support frame and at least one carrier or support element is positioned on said second support frame, wherein in one possible embodiment a plurality of carrier or support element is provided.

Another feature or aspect of an embodiment is believed at the time of the filing of this patent application to possibly reside broadly in the device, wherein the one support frame or at least one of the support frames can be driven in order to move the side walls towards one another.

Yet another feature or aspect of an embodiment is believed at the time of the filing of this patent application to possibly reside broadly in the device, wherein the one support frame or at least one of the support frames is guided by at least one rail.

Still another feature or aspect of an embodiment is believed at the time of the filing of this patent application to possibly reside broadly in the device, wherein at least one of the installation templates is mounted so as to be driveable on at least one of the support frames in order to move the side walls towards one another.

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one embodiment of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various embodiments may be used with at least one embodiment or all of the embodiments, if more than one embodiment is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein except for the exceptions indicated herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

All of the patents, patent applications or patent publications, which were cited in the International Search Report dated Dec. 23, 2008, and/or cited elsewhere are hereby incorporated by reference as if set forth in their entirety herein, except for the exceptions indicated herein, as follows: EP 1,008,510, having the title "Production of vehicles," published on Jun. 14, 2000; EP 1,281,471, having the following English translation of the German title "System and method for joining components," published on Feb. 5, 2003; U.S. Pat. No. 7,044,707, having the title "Machine for displacement of receptacles in front of inspection stations," published on May 16, 2006; US 2004/238475, having the title "System and method for stacking a predetermined number of nestable objects," published on Dec. 2, 2004; EP 1,331,059, having the following English translation of the German title "Fastening device for containers and processes for clamping, positioning and processing containers, barrels, cauldrons, tubes and similar using such a fastening device," published on Jul. 30, 2003; GB 2,427,175, having the title "Assembly method for a vehicle," published on Dec. 20, 2006; U.S. Pat. No. 5,217,288, having the title "Beverage brewer with interlocking component parts for nontool assembly/disassembly," published on Jun. 8, 1993; U.S. Pat. No. 6,029,562, having the title "Modular beverage brewing system with interlocking assembly," published on Feb. 29, 2000; U.S. Pat. No. 3,307,894, having the title "Structural members for modular units," published on Mar. 7, 1967; and US 2005/155319, having the title "Machine structure, in particular for handling fluid products, and process for assembling it," published on Jul. 21, 2005.

U.S. patent application Ser. No. 12/605,025, filed on Oct. 23, 2009, having inventors Klaus JENDRICHOWSKI and Ulrich WIEDEMANN, Attorney Docket No. NHL-HOL-254A, and title "BEVERAGE BOTTLE HANDLING MACHINE CONSTRUCTION METHOD FOR CONSTRUCTING A BEVERAGE BOTTLE HANDLING MACHINE, SUCH AS A BEVERAGE BOTTLE CLEANING MACHINE, A BEVERAGE BOTTLE PASTEURIZATION MACHINE, AND A BEVERAGE BOTTLE SHRINK WRAP MACHINE IN A BEVERAGE BOTTLING PLANT," and its corresponding Federal Republic of Germany Patent Application No. 10 2007 019 378.7, filed on Apr. 23, 2007, and International Patent Application PCT/EP2008/002138, filed on Mar. 18, 2008, having WIPO Publication No. WO 2008/128607 and inventors Klaus JENDRICHOWSKI and Ulrich WIEDEMANN are hereby incorporated by reference as if set forth in their entirety herein.

All of the patents, patent applications or patent publications, which were cited in the International Search Report for International Patent Application PCT/EP2008/002138 dated Jun. 26, 2008, and/or cited elsewhere are hereby incorporated by reference as if set forth in their entirety herein as follows: EP 1,008,510, having the title "Production of vehicles," published on Jun. 14, 2000; GB 2,427,175, having the title "Assembly method for you vehicle," published on Dec. 20, 2006; GB 1,601,603, having the title "IMPROVEMENTS IN OR RELATING TO THE ROLLER ASSEMBLY ACCESSORIES FOR PRINTING MACHINES," published Nov. 4, 1981; EP 1,331,059, having the following English translation of the German title, "Fastening device for containers and processes for clamping, positioning and processing containers, barrels, cauldrons, tubes and similar using such a fastening device," published on Jul. 30, 2003; and U.S. Pat. No. 5,035,046, having the title "Device for assembling louver windows and doors," published on Jul. 30, 1991.

All of the patents, patent applications or patent publications, which were cited in the German Office Action for German Patent Application No. 10 2007 019 378.7 dated May 8, 2007, and/or cited elsewhere are hereby incorporated by reference as if set forth in their entirety herein as follows: DE 34 33 445, having the following English translation of the German title, "Process for producing a box-shaped storage and transportation container and equipment for carrying out said process," published on Mar. 20, 1986.

Some examples of apparatus and methods of sterilizing or cleaning containers that may possibly be utilized or possibly adapted for use in at least one possible embodiment of the present application may possibly be found in the following U.S. Pat. No. 5,092,356 issued to Grot on Mar. 3, 1992; U.S. Pat. No. 5,320,144 issued to Ahlers on Jun. 14, 1994; U.S. Pat. No. 5,533,552 issued to Ahlers on Jul. 9, 1996; U.S. Pat. No. 5,558,135 issued to Kronseder et al. on Sep. 24, 1996; and U.S. Pat. No. 5,896,899 issued to Schlitz on Apr. 27, 1999.

Some examples of shrink wrapping machines or machines for wrapping items in plastic film which may possibly be utilized or adapted for use in at least one possible embodiment may possibly be found in the following U.S. Pat. No. 6,826,893, entitled "Apparatus for wrapping products with plastic film;" U.S. Pat. No. 6,739,115, entitled "Equipment for wrapping groups of products in plastic film;" U.S. Pat. No. 5,878,555, entitled "Apparatus for wrapping articles in plastic film;" U.S. Pat. No. 5,787,691, entitled "Apparatus for wrapping articles in plastic film;" U.S. Pat. No. 5,519,983, entitled "Shrink wrap packaging system with an ultrasonic side sealer;" U.S. Pat. No. 4,956,963, entitled "Method of sealing a shrink wrap package;" U.S. Pat. No. 4,873,814, entitled "Method of making a shrink wrap package;" U.S. Pat. No. 4,214,419, entitled "Collating and shrink wrap packaging apparatus;" U.S. Pat. No. 6,484,475, entitled "Modular packaging machine;" U.S. Pat. No. 4,694,633, entitled "Film wrapping machine;" U.S. Pat. No. 4,118,916, entitled "Thermoplastic wrapping machine;" U.S. Pat. No. 4,118,916, entitled "Thermoplastic wrapping machine;" U.S. Pat. No. 5,371,999, entitled "Shrink film wrapping machine;" U.S. Pat. No. 4,748,795, entitled "Film wrapping machine;" and U.S. Pat. No. 5,115,620, entitled "Wrapping machine."

Some examples of bottling plants comprising pasteurizing or treatment devices which may possibly be utilized or adapted for use in at least one possible embodiment of the present application may possibly be found in the following U.S. Pat. No. 7,513,092, entitled "Beverage bottling plant for filling bottles with a liquid beverage filling material, and a method for the operation thereof," published on Apr. 7, 2009; U.S. Pat. No. 6,834,473, entitled "Bottling plant and method of operating a bottling plant and a bottling plant with sections for stabilizing the bottled product," published on Dec. 28, 2004; and U.S. Pat. No. 6,374,575, entitled "Bottling plant and method of operating a bottling plant," published on Apr. 23, 2002.

Some examples of epoxy resin adhesives which may possibly be utilized or adapted for use in at least one possible embodiment according to the present application may possibly be found in the following U.S. Pat. No. 5,977,242, entitled "Two-part emulsion adhesive," published on Nov. 2, 1999; U.S. Pat. No. 5,229,438 entitled "Two-component epoxy resin compositions," published on Jul. 20, 1993; U.S. Pat. No. 4,661,539 entitled "Sag resistant two-component epoxy structural adhesive," published on Apr. 28, 1987; U.S. Pat. No. 5,385,990 entitled "Structural adhesive composition having high temperature resistance," published on Jan. 31, 1995; U.S. Pat. No. 4,921,912 entitled "Epoxy resin composition containing acrylic oligomer, amine and amine-terminated nitrile rubber," published on May 1, 1990; U.S. Pat. No. 6,572,971 entitled "Structural modified epoxy adhesive compositions," published on Jun. 3, 2003; and U.S. Pat. No. 6,998,011 entitled "Epoxy adhesive having improved impact resistance," published on Feb. 14, 2006.

Another example of epoxy resin adhesives which may be utilized or adapted for use in at least one possible embodiment of the present application, may possibly comprise 3M™ Scotch-Weld™ Epoxy Adhesive/Coating 2290 manufactured by 3M™, headquartered at 3M Center, St. Paul, Minn. 55144, United States. 3M™ Scotch-Weld™ Epoxy Adhesive/Coating 2290 is an epoxy adhesive which may be used for metal to metal bonding. A description of 3M™ Scotch-Weld™ Epoxy Adhesive/Coating 2290 and its uses are provided by 3M™ in a Technical Data Sheet dated June, 2000. The description of the 3M™ Scotch-Weld™ Epoxy Adhesive/Coating™ 2290 product is located in the Technical Data Sheet under the heading, "Product Description." The product description reads as follows:

"3M™ Scotch-Weld™ Epoxy Adhesive/Coating 2290 is an amber tinted thermosetting adhesive/coating for metal to metal bonding and coating. It can be used to assemble laminated steel cores for electrical motor stators and rotors, to adhere copper foil to B-staged epoxy in the manufacture of printed circuits, and to coat, protect, and utilize coils and electronic assemblies."

Instructions for the use of 3M™ ScotchWeld™ Epoxy Adhesive/Coating 2290 as an adhesive are provided by 3M™ in the Technical Data Sheet dated June, 2000. The instructions recommend that the epoxy should be applied in a layer at a thickness of 1 mil (0.001 inches) between the two surfaces to be bonded. The instructions for using 3M™ Scotch-Weld™ Epoxy Adhesive/Coating 2290 as an adhesive are in the Technical Data Sheet under the heading, "Adhesive Application," under the heading, "Handling/Curing Information." The instructions read as follows:

"3M™ Scotch-Weld Expoxy/Adhesive™ Coating 2290 can be applied by brushing, flow coating, dip coating, roll coating, knife coating and spraying. For spray application, use a DeVilbiss JGA-70-FX spray gun or equivalent applicator. The atomizing air should be approximately 30 psi.

"Apply the adhesive at a dry film thickness of 1 mil if coating only one surface. If coating two surfaces, apply a 0.5 mil dry film to each surface. For film thickness less than 1 mil, it may be necessary to dilute Scotch-Weld 2290.

"For dilution, a 4 parts by weight methyl ethyl ketone to 1 part by weight tetrahydrofuran solution should be made. (A dilution of 1 part of this solution to 1 part of Scotch-Weld 2290 will give a dried film thickness of approximately 0.5 mil). coverage per 1 mil dry film thickness is approximately 300 sq. ft./gal."

The above description and instructions for use of 3M™ ScotchWeld™ Expoxy/Adhesive may be generally applied to other epoxy adhesives which may possibly be utilized in at least one possible embodiment of the present application. Other types of epoxy adhesives may be applied in layers of 0.0005 inches in thickness. Other types of epoxy adhesives may be applied in layers of 0.002 inches in thickness. Other types of epoxy adhesives may be applied in layers that are less than 0.0005 inches in thickness. Other types of epoxy adhesives may be applied in layers greater than 0.002 inches. Other types of epoxy adhesives may be applied in layers ranging in thickness by increments of 0.001 inches within the range of 0.0005 inches to 0.002 inches.

Still another example of epoxy adhesive which may possibly be utilized or adapted for use in at least one possible embodiment according to the present application may possibly comprise Metal Welder™, manufactured by ITW Devcon, headquartered at 30 Endicott Street, Danvers, Mass. 01923, United States. A description of Metal Welder™ and its uses are provided by ITW Devcon in a Technical Data Sheet dated Sep. 15, 2006. Metal Welder™ is an epoxy adhesive which may be used for metal to metal bonding. The description of the Metal Welder™ product is located in the Technical Data Sheet under the heading, "Description." The product description reads as follows: "Fast curing 10:1 methacrylate adhesive designed for structural bonding of metals without primers. The system requires little to no surface preparation or primers." Instructions for the application of Metal Welder™ as an adhesive are provided by ITW Devcon in the Technical Data Sheet dated Sep. 15, 2006. The instructions recommend that the epoxy should be applied in a layer at a thickness of 0.012 inches between the two surfaces to be bonded. The instructions for using Metal Welder™ as an adhesive are in the Technical Data Sheet under the heading, "Application Instructions." The instructions read as follows: "1. Apply mixed product directly to one surface in an even film or as a bead. 2. Assemble with mating part within recommended working time. 3. Apply firm pressure between mating parts to minimize any gap and ensure good contact (a small fillet of product should flow out the edges to display adequate gap fill.) 4. Bond line thickness of mixed adhesive should be @ 0.012 [inches] for optimum adhesion. For very large gaps: 1. Apply product to both surfaces 2. Spread to cover entire area OR make a bead pattern to allow flow throughout the joint. Let bonded assemblies stand for recommended functional cure time prior to handling."

The above description and instructions for use of Metal Welder™ may be generally applied to other epoxy adhesives which may possibly be utilized in at least one possible embodiment of the present application. Other types of epoxy adhesives may be applied in layers of 0.006 inches in thickness. Other types of epoxy adhesives may be applied in layers of 0.024 inches in thickness. Other types of epoxy adhesives may be applied in layers that are less than 0.006 inches in thickness. Other types of epoxy adhesives may be applied in layers greater than 0.024 inches. Other types of epoxy adhesives may be applied in layers ranging in thickness by increments of 0.001 inches within the range of 0.006 inches to 0.024 inches.

Some examples of welding apparatuses and methods for welding which may be configured to overcome disadvantages therein may possibly be found in the following U.S. Pat. No. 5,124,527, entitled "Arc welding method and apparatus," published on Jun. 23, 1992; U.S. Pat. No. 7,107,118, entitled "Laser welding control system," published on Sep. 12, 2006; U.S. Pat. No. 5,478,983, entitled "Process and apparatus for welding or heat treating by laser," published on Dec. 26, 1995; U.S. Pat. No. 4,658,110, entitled "Method and apparatus for welding," published on Apr. 14, 1987; U.S. Pat. No. 4,835,357, entitled "Sheet metal laser welding," published on May 30, 1989; and U.S. Pat. No. 3,937,918, entitled "Beam carriage type automatic arc welding apparatus with welding head tracking mechanism," published on Feb. 10, 1976.

Some examples of rivets which may possibly be utilized or adapted for use in at least one possible embodiment according to the present application may possibly be found in the following U.S. Pat. No. 7,566,195 entitled "Blind rivet," published on Jul. 28, 2009; U.S. Pat. No. 7,396,287 entitled "Blind rivet," published on Jul. 8, 2008; U.S. Pat. No. 7,198,444 entitled "Multi-grip blind rivet," published on Apr. 3, 2007; U.S. Pat. No. 7,393,169 entitled "Blind rivet for a threaded joint," published on Jul. 1, 2008; U.S. Pat. No. 6,428,255 entitled "Blind rivet," published on Aug. 6, 2002; and U.S. Pat. No. 7,273,338 entitled "Blind rivet and method of assembly," published on Sep. 25, 2007.

Some examples of heaters which may possibly be utilized or adapted for use in at least one possible embodiment according to the present application may possibly be found in the following U.S. Pat. No. 7,499,633 entitled "Infrared heater," published on Mar. 3, 2009; U.S. Pat. No. 7,133,604 entitled "Infrared air heater with multiple light sources and reflective enclosure," published Nov. 7, 2006; U.S. Pat. No. 7,025,940 entitled "Flameless combustor process heater," published on Apr. 11, 2006; U.S. Pat. No. 4,357,931 entitled "Flameless heat source," published on Nov. 9, 1982; U.S. Pat. No. D457,044 entitled "Hot air blower," published on May 14, 2002; and U.S. Pat. No. 5,937,139 entitled "Portable hot-air blower," published on Aug. 10, 1999.

Some examples of laser beam welding methods which may possibly be utilized or adapted for use in at least one possible embodiment according to the present application may possibly be found in the following U.S. Pat. No. 7,588,658 entitled "Laser-transmissible resin composition and method for laser welding using it," published on Sep. 15, 2009; U.S. Pat. No. 7,274,856 entitled "Waveguide apparatus and method for laser welding," published on Sep. 25, 2007; U.S. Pat. No. 7,265,314 entitled "Method and apparatus for laser welding using a CW laser beam combined with a pulsed laser beam," published on Sep. 4, 2007; U.S. Pat. No. 6,906,281 entitled "Method for laser welding of metal," published on Jun. 14, 2005; U.S. Pat. No. 6,750,421 entitled "Method and system for laser welding," published on Jun. 15, 2004; and U.S. Pat. No. 7,241,971 entitled "Laser/arc hybrid welding process for ferritic steels," published on Jul. 10, 2007.

The patents, patent applications, and patent publications listed above in the preceding paragraph(s) are herein incorporated by reference as if set forth in their entirety except for the exceptions indicated herein. The purpose of incorporating U.S. patents, Foreign patents, publications, etc. is solely to provide additional information relating to technical features of one or more embodiments, which information may not be completely disclosed in the wording in the pages of this application. However, words relating to the opinions and judgments of the author and not directly relating to the technical details of the description of the embodiments therein are not incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned words in this sentence, when not used to describe technical features of one or more embodiments of the patents, patent applications, and patent publications, are not considered to be incorporated by reference herein.

The corresponding foreign and international patent publication applications, namely, Federal Republic of Germany Patent Application No. 10 2007 041 251.9, filed on Aug. 30, 2007, having inventors Klaus JENDRICHOWSKI and Ulrich WIEDEMANN, and DE-OS 10 2007 041 251.9 and DE-PS 10 2007 041 251.9, and International Application No. PCT/EP2008/005886, filed on Jul. 18, 2008, having WIPO Publication No. WO 2009/030310 and inventors Klaus JENDRICHOWSKI and Ulrich WIEDEMANN, are hereby incorporated by reference as if set forth in their entirety herein, except for the exceptions indicated herein, for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein except for the exceptions indicated herein.

The purpose of incorporating the corresponding foreign equivalent patent application(s), that is, PCT/EP2008/005886 and German Patent Application 10 2007 041 251.9, is solely for the purpose of providing a basis of correction of any wording in the pages of the present application, which may have been mistranslated or misinterpreted by the translator. However, words relating to opinions and judgments of the author and not directly relating to the technical details of the description of the embodiments therein are not to be incorporated by reference. The words all, always, absolutely, consistently, preferably, guarantee, particularly, constantly, ensure, necessarily, immediately, endlessly, avoid, exactly, continually, expediently, ideal, need, must, only, perpetual, precise, perfect, require, requisite, simultaneous, total, unavoidable, and unnecessary, or words substantially equivalent to the above-mentioned word in this sentence, when not used to describe technical features of one or more embodiments of the patents, patent applications, and patent publications, are not generally considered to be incorporated by reference herein.

Statements made in the original foreign patent applications PCT/EP2008/005886 and DE 10 2007 041 251.9 from which this patent application claims priority which do not have to do with the correction of the translation in this patent application are not to be included in this patent application in the incorporation by reference.

Any statements about admissions of prior art in the original foreign patent applications PCT/EP2008/005886 and DE 10 2007 041 251.9 are not to be included in this patent application in the incorporation by reference, since the laws relating to prior art in non-U.S. Patent Offices and courts may be substantially different from the Patent Laws of the United States.

All of the references and documents, cited in any of the documents cited herein, are hereby incorporated by reference as if set forth in their entirety herein except for the exceptions indicated herein. All of the documents cited herein, referred to in the immediately preceding sentence, include all of the patents, patent applications and publications cited anywhere in the present application.

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment(s), and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72(b):

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

What is claimed is:

1. A method of constructing a beverage container handling machine, said method comprising:
   holding separate first and second walls of said beverage container handling machine opposite one another in a holding structure not part of said beverage container handling machine;
   positioning middle structural parts of said beverage container handling machine between said first and second walls by holding and/or supporting said middle structural parts using support elements, which are part of at least one of said first and second walls;
   moving at least one of said first and second walls to close the distance between said first and second walls and enclose said middle structural parts, and thereby connecting said first and second walls; and
   bonding and/or riveting at least one of said middle structural parts to at least one of said first and second walls.

2. The method according to claim 1, wherein said beverage container handling machine comprises a cleaning machine configured to clean beverage containers.

3. The method according to claim 1, wherein said beverage container handling machine comprises a pasteurizing machine configured to pasteurize a beverage in beverage containers.

4. The method according to claim 1, wherein said beverage container handling machine comprises a shrink wrapping machine configured to shrink-wrap groups of beverage containers.

5. The method according to claim 1, wherein said step of bonding and/or riveting comprises riveting at least one of said middle structural parts to at least one of said first and second walls using pop rivets or locking eye bolts.

6. The method according to claim 5, wherein said step of positioning said middle structural parts comprises securing said middle structural parts to said first wall and loosely holding said middle structural parts with said support elements that are part of said second wall.

7. The method according to claim 6, wherein:
   said method comprises bonding at least one of said middle structural parts to at least one of said first and second walls using an adhesive material disposed on at least one end face element of said middle structural parts to be bonded;
   said step of positioning said middle structural parts comprises positioning said middle structural parts to be bonded such that said adhesive material of each of said end face elements faces a corresponding one of said first and second walls; and
   said step of bonding comprises pressing said adhesive material of each end face element against its corresponding wall.

8. The method according to claim 7, wherein:
   said step of riveting comprises pressing said first and second walls and said middle structural parts together with said rivets at a force and for a time sufficient to permit formation of an adhesive bond between said first and second walls and said middle structural parts; and
   said step of bonding comprises intermittently heating portions of said first and second walls in contact with said adhesive material using a hot air blower or a flameless heater.

9. The method according to claim 8, wherein:
   at least one of said first and second walls comprises an inner wall and an outer wall that are substantially parallel to one another;
   said inner wall comprises recesses and openings that are configured to at least one of: permit the passage of said support elements therethrough, interconnect said inner wall and said outer wall, and support said middle structural parts; and
   said method further comprises securing or connecting said support elements to said outer wall, and then pushing said inner wall onto said support elements.

10. The method according to claim 9, wherein said method further comprises:
    forming at least part of said recesses and openings using an electron beam method or a laser beam method; and
    forming at least one of: dimensioning lines and tear lines on at least one of said first and second walls using an electron beam method or a laser beam method.

11. The method according to claim 10, wherein:
    a plurality of said middle structural parts are prefabricated components comprising a plurality of individual parts;
    said step of positioning said middle structural parts comprises positioning said middle structural parts beginning adjacent the bottom of said first and second walls and then proceeding upwardly and finishing adjacent the top of said first and second walls;
    said rivets are pre-tensioned with a force of more than three kilonewtons;
    one of (A) and (B):
       (A) said adhesive comprises an epoxy resin; and
       (B) said adhesive comprises an epoxy resin and an additive comprising metal or ceramic substances; and one of (C), (D), and (E):
       (C) said step of bonding and/or riveting comprises bonding and riveting each of said middle structural parts to each of said first and second walls;
       (D) said method further comprises attaching at least one of said middle structural parts to at least one of said first and second walls using screw-type connections in place of rivets; and
       (E) said method further comprises attaching at least one of said middle structural parts to at least one of said first and second walls using a locking eye bolt having at least one groove or a plurality of grooves on the outer surface thereof.

12. The method according to claim 1, wherein said method further comprises welding, laser beam welding, or electron beam welding at least one of said middle structural parts to at least one of said first and second walls.

13. The method according to claim 12, wherein at least one of (F) and (G):
    (F) said method further comprises bonding and riveting a first portion of one of said middle structural parts to said first wall, and welding, laser beam welding, or electron beam welding a second portion of said one of said first middle structural parts to said second wall; and
    (G) said step of welding at least one of said middle structural parts comprises: placing said at least one middle structural part flush against an interior surface of one of said first and second walls, then directing a laser beam or electron beam at an adjacent exterior surface of said wall, and then welding, through said wall, said at least one middle structural part to said wall, or said at least one middle structural part and said wall to each other.

* * * * *